US012798399B2

(12) United States Patent
Kaneko et al.

(10) Patent No.: US 12,798,399 B2
(45) Date of Patent: Nov. 17, 2026

(54) DRIVE SYSTEM FOR DUMP TRUCK

(71) Applicant: Hitachi Construction Machinery Co., Ltd., Tokyo (JP)

(72) Inventors: Satoru Kaneko, Tokyo (JP); Masatoshi Yoshimura, Tokyo (JP); Kosuke Matsuo, Tokyo (JP); Seiji Ishida, Ibaraki (JP); Toshihiko Watanabe, Ibaraki (JP); Tokuma Ikegami, Ibaraki (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 201 days.

(21) Appl. No.: 18/688,394

(22) PCT Filed: Oct. 17, 2022

(86) PCT No.: PCT/JP2022/038621
§ 371 (c)(1),
(2) Date: Dec. 17, 2024

(87) PCT Pub. No.: WO2023/074445
PCT Pub. Date: May 4, 2023

(65) Prior Publication Data
US 2025/0326301 A1 Oct. 23, 2025

(30) Foreign Application Priority Data
Oct. 25, 2021 (JP) ................................ 2021-174190

(51) Int. Cl.
*B60L 50/13* (2019.01)
*B60L 7/06* (2006.01)
(Continued)

(52) U.S. Cl.
CPC ................ *B60L 50/13* (2019.02); *B60L 7/06* (2013.01); *H02P 21/22* (2016.02);
(Continued)

(58) Field of Classification Search
CPC ........ B60L 50/13; B60L 7/06; B60L 2200/40; B60L 2210/30; B60L 2210/42; B60L 2240/429; H02P 21/22
See application file for complete search history.

(56) References Cited

U.S. PATENT DOCUMENTS

2010/0013299 A1* 1/2010 Amler ...................... H02P 3/22 307/82
2021/0135584 A1* 5/2021 Dutta ............... H02M 3/33584
(Continued)

FOREIGN PATENT DOCUMENTS

CN 105186955 A 12/2015
JP 2021-48671 A 3/2021
(Continued)

OTHER PUBLICATIONS

International Preliminary Report on Patentability (PCT/IB/338 & PCT/IB/373) issued in PCT Application No. PCT/JP2022/038621 dated May 10, 2024, including English translation of Written Opinion (PCT/ISA/237) (6 pages).
(Continued)

*Primary Examiner* — Adnan M Mirza
(74) *Attorney, Agent, or Firm* — Crowell & Moring LLP

(57) ABSTRACT

It is an object of the present invention to provide a drive system for dump trucks that is capable of reducing the capacity of a converter that excites a two-winding induced generator and of performing output control according to the converter capacity. To achieve the object, the drive system includes an induced generator having a primary winding including a main winding and a sub-winding, a rectifier for converting an AC voltage generated across the main winding into a DC voltage, a propulsive machinery side load connected to the rectifier, a converter connected to the sub-winding for exciting a secondary winding of the induced generator and converting an AC voltage generated across the
(Continued)

sub-winding into a DC voltage, an accessory side load connected to the converter, and a controller for controlling the converter, in which the controller controls a DC voltage of the accessory side load according to electric power required by the accessory side load and controls a DC voltage of the propulsive machinery side load according to electric power required by the propulsive machinery side load and a converter capacity that represents a current capacity of the converter.

4 Claims, 7 Drawing Sheets

(51) Int. Cl.
*H02P 21/22* (2016.01)
*H02P 101/45* (2016.01)

(52) U.S. Cl.
CPC ....... *B60L 2200/40* (2013.01); *B60L 2210/30* (2013.01); *B60L 2210/42* (2013.01); *B60L 2240/429* (2013.01); *H02P 2101/45* (2015.01)

(56) References Cited

U.S. PATENT DOCUMENTS

2022/0001854 A1 1/2022 Kadota et al.
2023/0253858 A1 8/2023 Nishihama et al.

FOREIGN PATENT DOCUMENTS

JP 6923722 B1 8/2021
WO WO 2020/116272 A1 6/2020

OTHER PUBLICATIONS

Extended European Search Report issued in European Application No. 228867736 dated Aug. 5, 2025 (7 pages).
Haijun, X. et al., "Analysis, Comparison, and Discussion of Control Strategies for Dual Stator-Winding Induction Generator DC Generating System", IEEE Journal of Emerging and Selected Topics in Power Electronics, Sep. 1, 2016, pp. 1007-1014, vol. 4, No. 3, XP011618039 (8 pages).
Yong L. et al., "Control of a Novel Dual Stator-Winding Induction Generatorfor wide speed-range operation", Power Electronics Specialists Conference, Jun. 7, 2007, pp. 2096-2101, XP093297638 (6 pages).
International Search Report (PCT/ISA/210) issued in PCT Application No. PCT/JP2022/038621 dated Dec. 13, 2022 with English translation (4 pages).
Japanese-language Written Opinion (PCT/ISA/237) issued in PCT Application No. PCT/JP2022/038621 dated Dec. 13, 2022 with English translation (6 pages).
Chinese-language Office Action issued in Chinese Application No. 202280060447.0 dated Aug. 31, 2026 with English translation (18 pages).

* cited by examiner

DRIVE SYSTEM FOR DUMP TRUCK

TECHNICAL FIELD

The present invention relates to a drive system including a two-winding induction generator having a primary winding that includes a main winding and an auxiliary winding.

BACKGROUND ART

In mines, there are operating a number of dump trucks each having a payload of 100 tons or more for carrying minerals and stripped soil from loading sites to dumping sites. There are predetermined routes from the loading sites to the dumping sites, and the dump trucks repeatedly travel back and forth along the same routes. A plurality of dump trucks of one class travel along one route and operate 24 hours a day. A fleet of such dump trucks that are large in size and operate for long hours takes as important a carrying efficiency that is represented by an amount of work per unit cost (initial cost plus running cost). Therefore, various efforts have been made in the art to operate dump trucks in order to lower the initial cost and reduce the running cost as much as possible for aiming at increasing the carrying efficiency. For reducing the running cost, it is necessary to reduce the fuel consumption. Consequently, there has been demand for drive systems that are of good efficiency and are capable of lowering the maintenance cost. One of such drive systems is an electrical drive system. While a mechanical type drive system transmits the power of an engine via a torque converter and a transmission to tires, the electrical drive system, by contrast, drives a generator with an engine and drives a travelling motor coupled to tire axles with the electric power generated by the generator. One prior technical document disclosing such an electrical drive system is Patent Document 1, for example.

The electrical drive system disclosed in Patent Document 1 includes a main generator and a sub-generator that are driven by an engine, a high-voltage rectifying circuit for converting three-phase AC electric power generated by the main generator into DC electric power, an inverter for converting the DC electric power outputted from the high-voltage rectifying circuit into three-phase AC electric power and outputting the three-phase AC electric power to a travelling motor, and a low-voltage rectifying circuit for converting three-phase AC electric power generated by the sub-generator into DC electric power and outputting the DC electric power to accessories.

PRIOR ART DOCUMENT

Patent Document

Patent Document 1: JP-2021-48671-A

SUMMARY OF THE INVENTION

Problems to be Solved by the Invention

The drive system disclosed in Patent Document 1 includes the main generator that generates electric power used to propel the dump truck and the sub-generator that generates electric power used to drive the accessories. Although these generators are not limited to any particular types, if field-winding generators in which a field winding is provided on a rotor, for example, are used as the generators, then converters required to convert the generated electric power into DC electric power may be inexpensive rectifiers. However, since the main generator and the sub-generator are provided separately from each other, brushes are required for supplying field currents to the respective rotors, with the results that the generators are large in overall size and high in cost. One conceivable means for solving the problems is to use, in place of the main generator and the sub-generator, a two-winding induced generator in which the winding of the main generator and the winding of the sub-generator are integrally combined with each other (two-winding type) and the generator is of the induction type free of brushes. The two-winding induced generator needs a converter newly added for performing voltage control. Here, the dump truck is a large-size machine whose weight reaches several hundred tons, and the travelling motor for driving the dump truck has a capacity of several thousand kW. Therefore, the current capacity of the converter (converter capacity) is so large that the drive system is of an increased cost.

The present invention has been made in view of the problems described above. It is an object of the present invention to provide a drive system for dump trucks that is capable of reducing the capacity of a converter that excites a two-winding induced generator and of performing output control according to the converter capacity.

Means for Solving the Problems

In order to achieve the above object, according to the present invention, there is provided a drive system for a dump truck, including an induced generator having a primary winding including a main winding and a sub-winding, a rectifier for converting an AC voltage generated across the main winding into a DC voltage, a propulsive machinery side load connected to the rectifier, a converter connected to the sub-winding for exciting a secondary winding of the induced generator and converting an AC voltage generated across the sub-winding into a DC voltage, an accessory side load connected to the converter, and a controller configured to control the converter. The controller is configured to control a DC voltage of the accessory side load according to electric power required by the accessory side load and control a DC voltage of the propulsive machinery side load according to electric power required by the propulsive machinery side load and a converter capacity that represents a current capacity of the converter.

According to the present invention arranged as described above, it is possible to reduce the capacity of the converter by connecting the converter that excites the secondary winding of the induced generator to the sub-winding. It is also possible to output the electric power required by the accessory side load by controlling the DC voltage of the accessory side load on the basis of the electric power required by the accessory side load. Furthermore, it is possible to control the DC voltage of the propulsive machinery side load within a range not exceeding the converter capacity by controlling the DC voltage of the propulsive machinery side load on the basis of the electric power required by the propulsive machinery side load and the converter capacity that represents a current capacity of the converter.

Advantages of the Invention

According to the present invention, it is possible for a drive system for dump trucks that has a two-winding induced generator to reduce the capacity of a converter that excites the two-winding induced generator and to perform output control according to the converter capacity.

MODES FOR CARRYING OUT THE INVENTION

Figure 1:
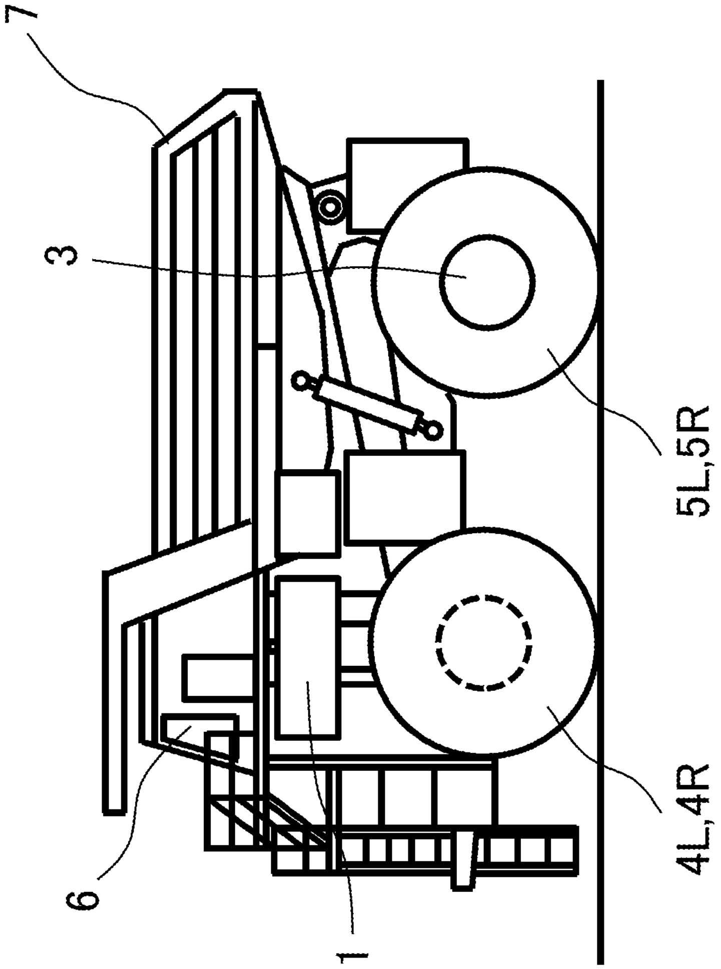
FIG. 1 is a view illustrating a structure of a dump truck for mines.

Embodiments of the present invention will be described hereinbelow with reference to the drawings. In the drawings, equivalent components are denoted by identical reference characters, and their duplicate description will be omitted below.

First Embodiment

First, a dump truck for mines that incorporates drive systems according the embodiments of the present invention will be described below. The dump truck for mines repeats a cycle representing a series of work events that include loading itself with soil at a loading site, traveling from the loading site to a dumping site, dumping the soil at the dumping site, and traveling from the dumping site to the loading site.

FIG. 1 illustrates a structure of the dump truck for mines. As illustrated in FIG. 1, the dump truck for mines includes an engine 1 as a power source for a generator 20 (depicted in FIG. 3), a vessel 7 vertically swingably mounted on an upper rear portion of a machine body, and a driver's cabin 6 mounted on an upper front portion of the machine body. A pair of left and right driven wheels 4L and 4R are disposed on a lower front portion of the machine body, and a pair of left and right drive wheels 5L and 5R are disposed on a lower rear portion of the machine body. The drive wheels 5L and 5R are driven by a travelling motor 3 that is supplied with electric power from the generator 20.

An electrical type drive system for driving the drive wheels 5L and 5R will be described below.

Figure 2:
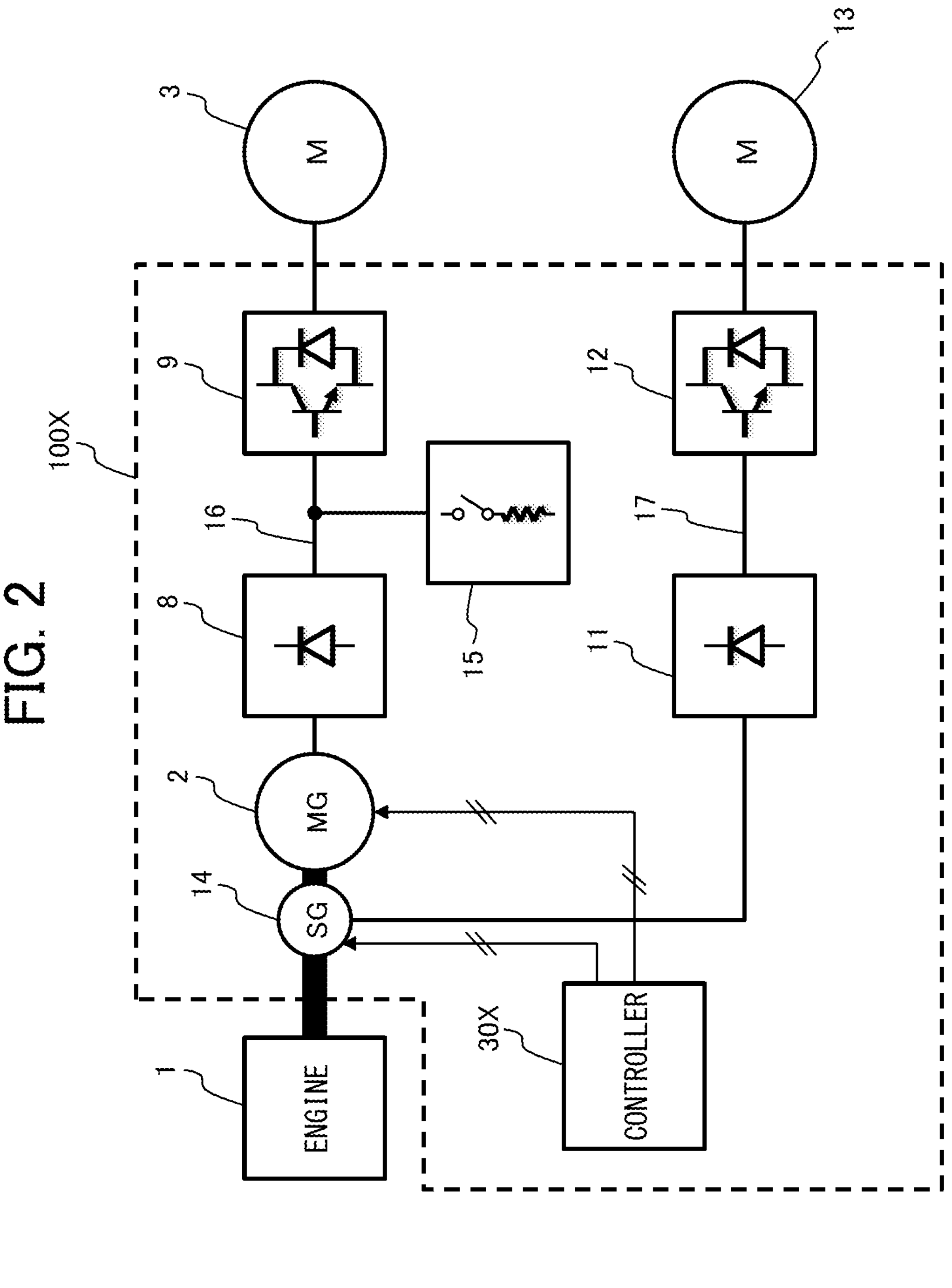
FIG. 2 is a diagram illustrating a configuration of a drive system according to a conventional art.

FIG. 2 illustrates a configuration of a drive system according to a conventional art. As illustrated in FIG. 2, the drive system, denoted by 100X, includes a main generator (MG) 2 and a sub-generator (SG) 14 that are driven by an engine 1, a travelling motor 3 for driving the drive wheels 5L and 5R, an accessory motor 13, a travelling inverter 9 as a propulsive machinery side load, an accessory inverter 12 as an accessory side load, a rectifier 8, a sub-rectifier 11, a discharging resistor 15, and a controller 30X for controlling the main generator 2 and the sub-generator 14.

The main generator 2 and the sub-generator 14 convert rotary energy of the engine 1 into electric energy (AC electric power). The rectifier 8 rectifies AC electric power supplied from the main generator 2 into DC electric power and supplies the DC electric power to the travelling inverter 9. The travelling inverter 9 converts the DC electric power supplied from the rectifier 8 into AC electric power and supplies the AC electric power to the travelling motor 3.

The sub-generator 14 is used as a power supply of an accessory system for driving accessories such as a cooling device. The sub-rectifier 11 rectifies AC electric power supplied from the sub-generator 14 into DC electric power and supplies the DC electric power to the accessory inverter 12. The accessory inverter 12 converts the DC electric power supplied from the sub-rectifier 11 into AC electric power and supplies the AC electric power to the accessory motor 13. The accessory motor 13 drives a cooling device (not illustrated) such as a blower, for example. In FIG. 2, only one set of the accessory inverter 12 and the accessory motor 13 is illustrated as an accessory system. However, since there are a plurality of devices representing accessories, a plurality of accessory inverters and accessory motors having capacities different from each other are mounted on an actual machine.

In a system that incorporates a secondary battery for an electric vehicle or the like, regenerative electric power generated when the travelling motor 3 is braked is retrieved in the secondary battery (to charge the secondary battery), and is discharged at the time instantaneously large power is required as for acceleration. On the other hand, dump trucks, with which the present invention is concerned, tend to avoid carrying heavy objects that leads to a reduction in the carrying efficiency, and often have a system free of a secondary battery. Such a system includes the discharging resistor 15 that consumes regenerative electric power generated by the travelling motor 3 when it is braked, making it possible to obtain electric braking forces from the travelling motor 3 while lowering an overvoltage on a DC bus on the travelling motor side (propulsive machinery side).

The drive system 100X described above is basically a diesel electric type drive system in which the rotary drive power of the engine is used to generate electric power from the generators, unlike mechanical type dump trucks in which the rotary power of the engine is used to directly drive the tires through a torque converter and a transmission. The drive system 100X includes the main generator 2 that generates electric power used to propel the dump truck and the sub-generator 14 that generates electric power used to drive the accessories. Although these generators are not limited to any particular types, if field-winding generators in which a field winding is provided on a rotor, for example, are used as the generators, then converters required to convert the generated electric power into DC electric power may be inexpensive rectifiers, as illustrated in FIG. 2. However, if field-winding generators are used, since the main generator 2 and the sub-generator 14 are provided separately from each other, brushes are also required for supplying field currents to the respective rotors, with the results that the generators are large in overall size and high in cost.

One conceivable means for solving the problems is to use, in place of the main generator 2 and the sub-generator 14, a two-winding induced generator in which the winding of the main generator 2 and the winding of the sub-generator 14 are integrally combined with each other (two-winding type) and the generator is of the induction type free of brushes.

Figure 3:
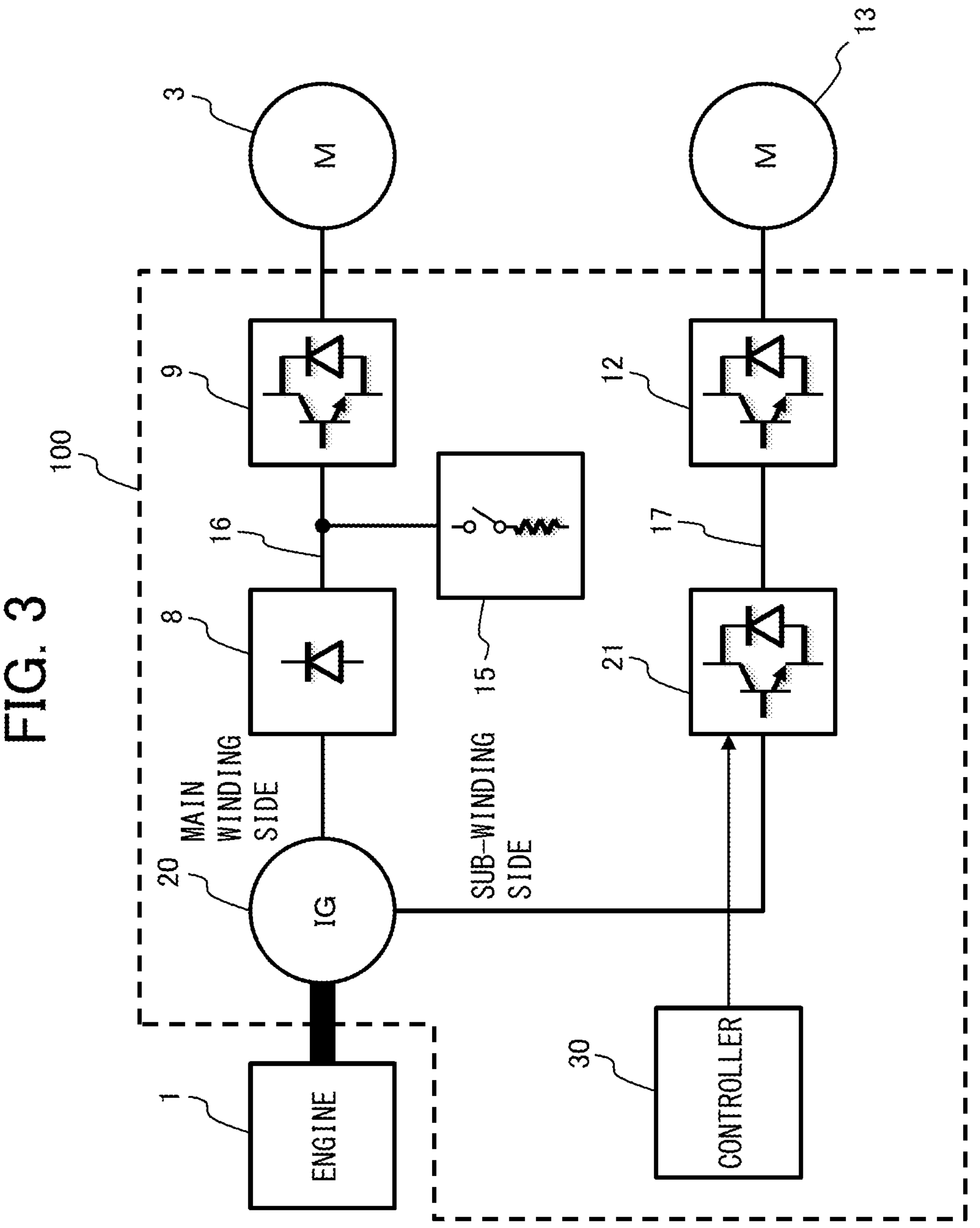
FIG. 3 is a diagram illustrating a configuration of a drive system according to a first embodiment of the present invention.

FIG. 3 illustrates a configuration of a drive system according to the present embodiment. As illustrated in FIG. 3, the drive system, denoted by 100, includes a two-winding induced generator (IG) 20, a travelling inverter 9, an accessory inverter 12, a rectifier 8, an excitation converter 21, a discharging resistor 15, and a controller 30 for integrally controlling the excitation converter 21, the travelling inverter 9, and the accessory inverter 12.

The rectifier 8 has its AC side connected to the main winding of the two-winding induced generator 20 and its DC side connected through a propulsive machinery side DC bus 16 to the travelling inverter 9 and the discharging resistor 15. The rectifier 8 rectifies AC electric power generated across the main winding into DC electric power and supplies the DC electric power to the propulsive machinery side DC bus 16. The travelling inverter 9 that is connected to the travelling motor 3 converts the DC electric power from the propulsive machinery side DC bus 16 into AC electric power and supplies the AC electric power to the travelling motor 3. The discharging resistor 15 is energized when the travelling motor 3 operates in a regenerative mode (when the travelling motor 3 is retarded), consuming electric power (regenerative electric power) generated by the travelling motor 3 in the regenerative mode. The excitation converter 21 has its AC side connected to the sub-winding of the two-winding induced generator 20 and its DC side connected through an accessory side DC bus 17 to the accessory inverter 12. The excitation converter 21 converts AC electric power generated across the sub-winding into DC electric power and supplies the DC electric power to the accessory side DC bus 17. The accessory inverter 12 that is connected to the accessory motor 13 converts the DC electric power from the accessory side DC bus 17 into AC electric power and supplies the AC electric power to the accessory motor 13. Since each of the travelling inverter 9 and the accessory inverter 12 is a voltage type inverter, they are required to control the voltages from the DC buses on respective input sides thereof into voltages capable of stably supplying electric power to the propulsive machinery side and the accessory side. To meet the requirement, it is necessary for the excitation converter 21 to stably control the voltages across the main winding and the sub-winding.

Here, the main winding of the two-winding induced generator 20 is connected to the travelling inverter 9 through only the rectifier 8 without being connected to a battery and a large-capacity capacitor, or is not connected to an electric power system. Therefore, the main winding of the two-winding induced generator 20 does not need to output a constant voltage. The voltages across the main winding and the sub-winding of the two-winding induced generator 20 are generally proportional to each other. Consequently, the excitation converter 21 that is connected to the sub-winding can change both of the voltages across the auxiliary winding and the main winding by exciting the auxiliary winding. By thus exciting the sub-winding of the two-winding induced generator 20 with the excitation converter 21, it is possible to make the generator including its propulsive machinery and accessory sides brushless. With the drive system 100 according to the present embodiment, as the capacity of the travelling inverter 9 is larger than the capacity of the accessory inverter 12, a better cost advantage can be achieved by connecting the converter that is more expensive than the rectifier to the accessory inverter 12 that is of smaller electric power requirements rather than to the travelling inverter 9.

Figure 4:
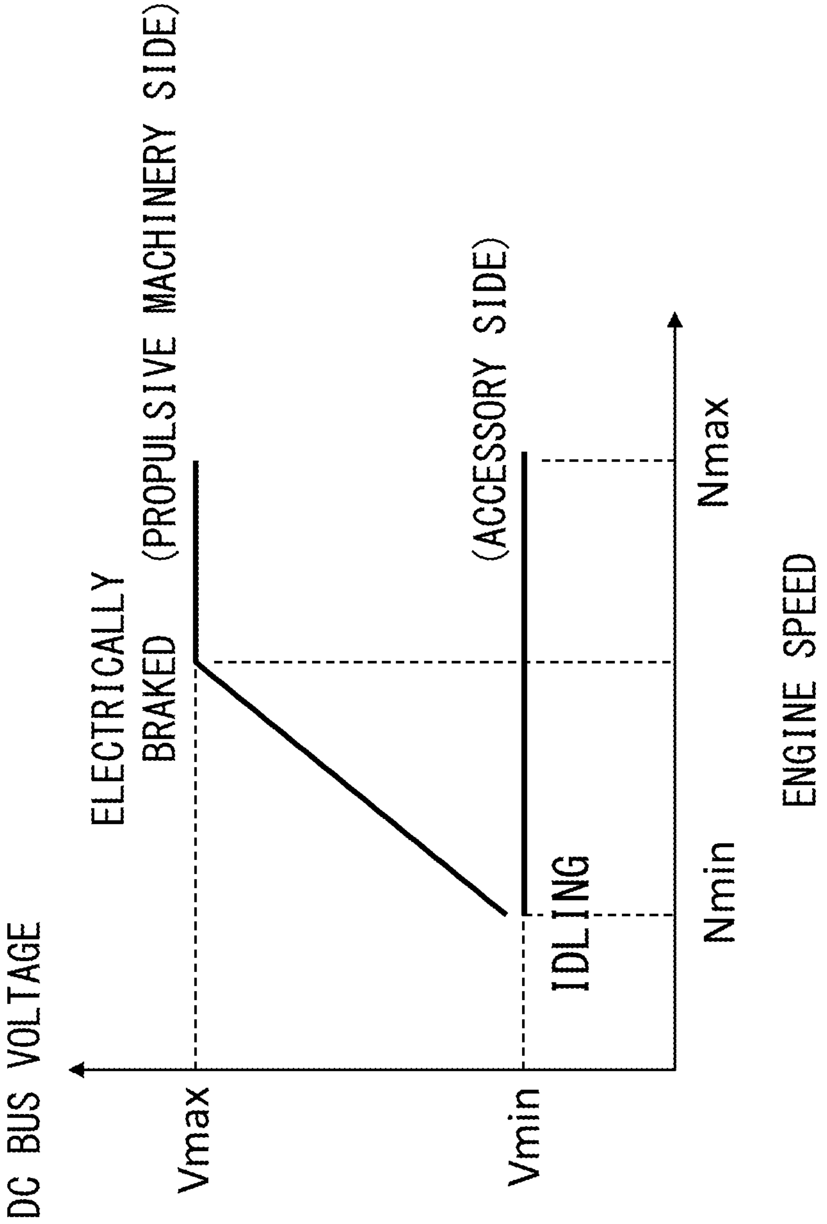
FIG. 4 is a diagram illustrating a relation between engine speeds and voltages on a propulsive machinery side DC bus and an accessory side DC bus.

FIG. 4 illustrates a relation between engine speeds and voltages on the propulsive machinery side DC bus 16 and the accessory side DC bus 17. In FIG. 4, the horizontal axis represents the engine speed, and the vertical axis represents the propulsive machinery side DC bus voltage and the accessory side DC bus voltage. The accessory side DC bus voltage is kept constant at Vmin from an idling engine speed (Nmin) to a maximum engine speed (Nmax). On the other hand, the propulsive machinery side DC bus voltage reaches a lowest voltage (>Vmin) when the engine is idling, and rises as the electric power required to drive the machine increases (the engine speed increases). When the machine is retarded (electrically braked), the propulsive machinery side DC bus voltage reaches a level near a maximum voltage Vmax. When the machine travels normally, the propulsive machinery side DC bus voltage varies within the above voltage range. The voltage on the propulsive machinery side DC bus 16 is not limited to the voltage characteristics illustrated in FIG. 4, and may be of such voltage characteristics that can stably output the electric power required by the travelling inverter 9. The accessory side DC bus voltage should desirably be controlled to be essentially constant because the accessories consume an essentially constant level of electric power. The controller 30 controls the currents of the two-winding induced generator 20 through the excitation converter 21 so as to have the propulsive machinery side output power (load) and the auxiliary side output power (load) of the two-winding induced generator 20 balanced in the operation of the machine and the voltage range described above.

Figure 5:
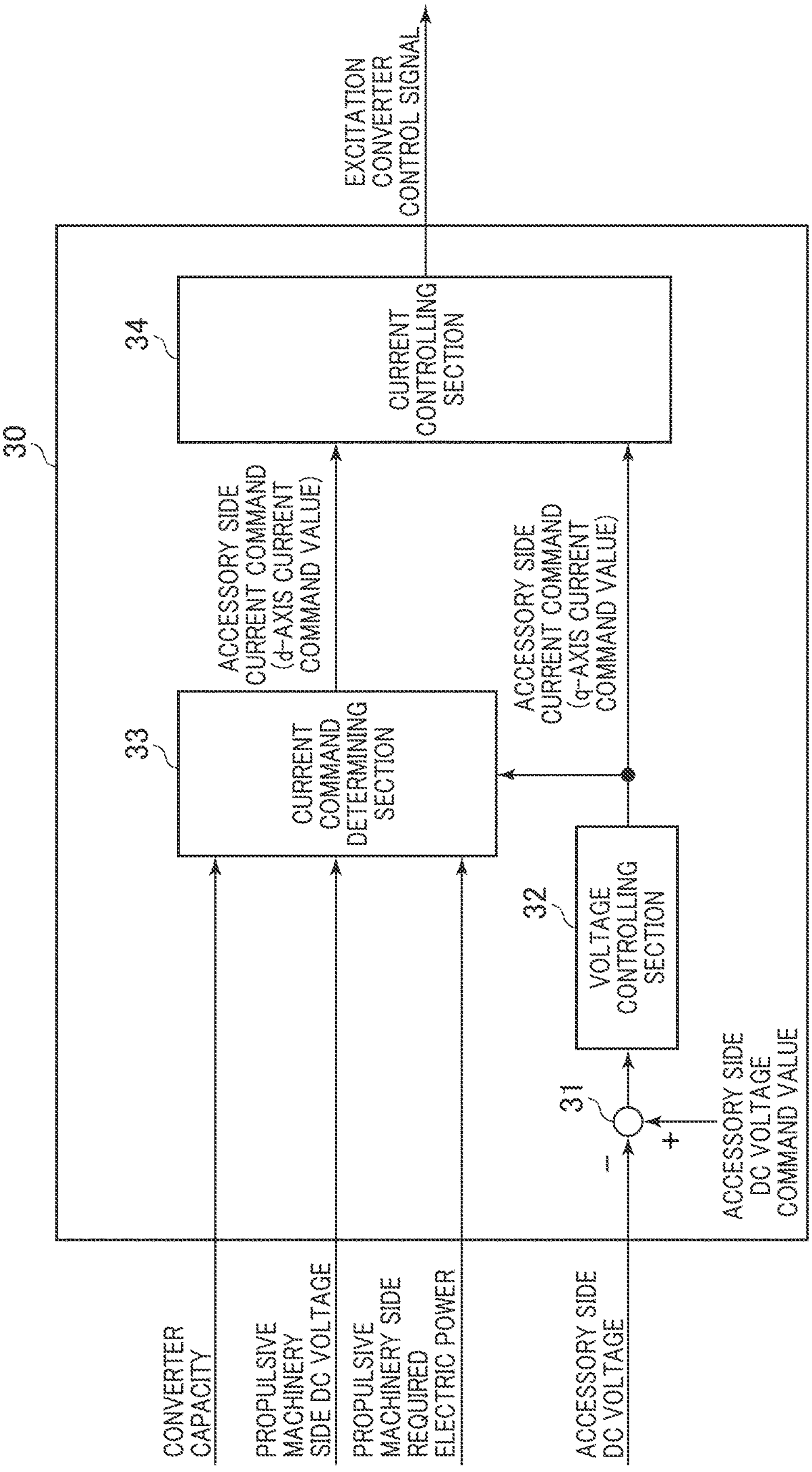
FIG. 5 is a block diagram illustrating blocks involved in control of an excitation converter in a processing sequence of a controller.

FIG. 5 is a block diagram illustrating blocks involved in the control of the excitation converter 21 in a processing sequence of the controller 30. As illustrated in FIG. 5, the controller 30 has a voltage deviation computing section 31, a voltage controlling section 32, a current command determining section 33, and a current controlling section 34. The controller 30 includes a control section having a computing and processing function, an input/output interface for sending signals to and receiving signals from an external device, and so forth. The controller 30 performs the functions of its sections by executing programs stored in a storage device such as a ROM.

The voltage deviation computing section 31 calculates a difference (voltage deviation) between an accessory side DC voltage command value preset in the controller 30 and the accessory side DC voltage, and outputs the difference to the voltage controlling section 32. The voltage controlling section 32 calculates an accessory side current command (q-axis current command value) based on the difference (voltage deviation) between the accessory side DC voltage command value and the accessory side DC voltage, and outputs the calculated accessory current command to the current command determining section 33 and the current controlling section 34. Specific contents of the computation performed by the voltage controlling section 32 are irrelevant to the present invention in particular, and may be carried out by, for example, a proportional plus integral process that is normally often used in the art. Here, the accessory side current command outputted from the voltage controlling section 32 is a current command corresponding to the q-axis with respect to the two-winding induced generator 20 because it is necessary to compensate for fluctuations of the voltage on the accessory side DC bus 17 that occur depending on the magnitude of the accessory side load with the effective electric power of the sub-winding because the excitation converter 21 connected to the sub-winding is connected directly to the accessory side load.

The current command determining section 33 calculates an accessory side current command (d-axis current command value) with respect to the two-winding induced generator 20 on the basis of the converter capacity (current capacity), the propulsive machinery side DC voltage, propulsive machinery side required electric power, and the accessory side current command (q-axis current command value), and outputs the calculated accessory current command to the current controlling section 34. Here, the accessory side current command outputted from the current command determining section 33 is a current command corresponding to the d-axis because the excitation converter 21 connected to the sub-winding adjusts magnetic fluxes for controlling the voltage across the winding.

The current controlling section 34 calculates an input voltage of the excitation converter 21 on the basis of the accessory side current commands (the d-axis current command value and the q-axis current command value), and outputs a control signal according to the calculated input voltage to the excitation converter 21. Specific contents of the computation performed by the current controlling section 34 are irrelevant to the present invention in particular, and may be carried out by, for example, a proportional plus integral process that is normally often used in the art.

Figure 6:
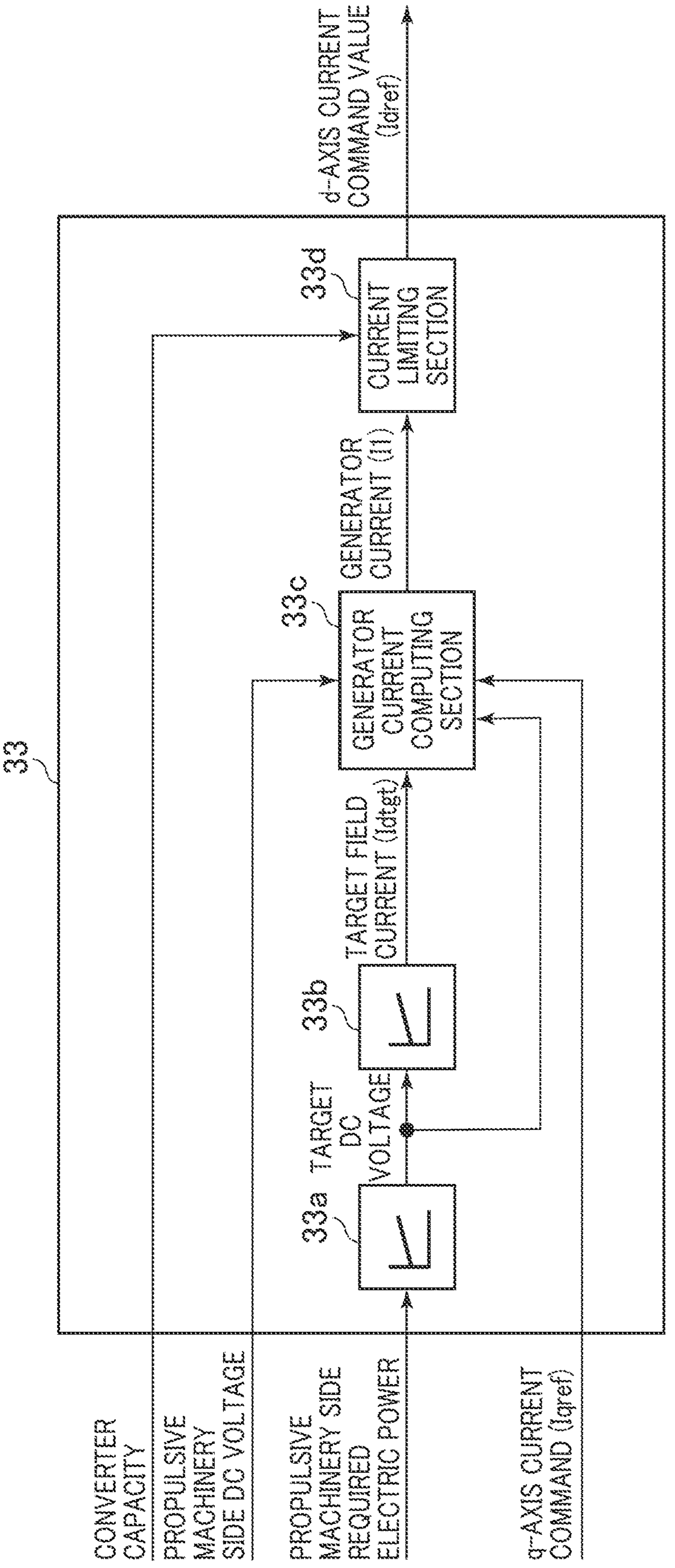
FIG. 6 is a block diagram illustrating a processing sequence of a current command determining section.

FIG. 6 is a block diagram illustrating a processing sequence of the current command determining section 33. As illustrated in FIG. 6, the current command determining section 33 has a target DC voltage determining section 33*a*, a target field current determining section 33*b*, a generator current computing section 33*c*, and a current limiting section 33*d*.

The target DC voltage determining section 33*a* determines a target value for the propulsive machinery side DC voltage (target DC voltage) according to the electric power required by the propulsive machinery side load 9, and outputs the determined target DC voltage to the target field current determining section 33*b* and the generator current computing section 33*c*. The target DC voltage may not necessarily be equal to a DC voltage according to the electric power required by the propulsive machinery side load 9, and is established in a range that can be output by the travelling inverter 9. If the propulsive machinery side DC voltage becomes a very low voltage, then an excessive current flows through the travelling inverter 9, possibly resulting in a large loss. Therefore, the target DC voltage is adjusted to make the propulsive machinery side DC voltage as high as possible. Here, taking the characteristics of the two-winding induced generator 20 and the travelling motor 3 into account in advance, the target DC voltage determining section 33*a* determines a target DC voltage according to the electric power required by the travelling motor 3. Processes of determining a target DC voltage may include a process of generating a table of data representing calculated results and searching the table for a target DC voltage and a process of determining a target DC voltage by solving actual characteristic equations.

The target field current determining section 33*b* determines a target field current (Idtgt) according to the target DC voltage and outputs the determined target field current to the generator current computing section 33*c*. Processes of determining a target field current may include a process of generating a table of data representing calculated results and searching the table for a target field current and a process of determining a target field current by solving actual characteristic equations.

The generator current computing section 33*c* calculates the magnitude (I1) of the current of the two-winding induced generator 20 on the basis of the q-axis current command value (Iqref) and the target field current (Idtgt). The magnitude (I1) of the current of the two-winding induced generator 20 is calculated according to the following equation (1):

$$I1 = \sqrt{(Idtgt^\wedge 2 + Iqref^\wedge 2)} \quad (1)$$

Here, in a case where the actual propulsive machinery side DC voltage and the target DC voltage deviate largely from each other, the generator current computing section 33*c* makes appropriate adjustments to increase or reduce the target field current (Idtgt) to bring the propulsive machinery side DC voltage closely to the target DC voltage value.

In a case where the magnitude (I1) of the current of the two-winding induced generator 20 exceeds the converter capacity (current capacity), the current limiting section 33*d* limits the target field current (Idtgt) in order to make the magnitude (I1) of the current of the two-winding induced generator 20 equal to or smaller than the converter capacity (current capacity) according to the equation (1), and determines the limited target field current (Idtgt) as the d-axis current command value (Idref). By thus determining the q-axis current command value (Iqref) based on the target DC voltage in a range not exceeding the capacity of the excitation converter 21, it is possible to control the DC voltage of the propulsive machinery side load 9 in the range not exceeding the capacity of the excitation converter 21 that is connected to the sub-winding of the two-winding induced generator 20.

Conclusion

According to the present embodiment, the drive system 100 for the dump truck includes the induced generator 20 having the primary winding including the main winding and the sub-winding, the rectifier 8 for converting the AC voltage generated across the main winding into the DC voltage, the propulsive machinery side load 9 connected to the rectifier 8, the converter 21 connected to the sub-winding for exciting the secondary winding of the induced generator 20 and converting the AC voltage generated across the sub-winding into the DC voltage, the accessory side load 12 connected to the converter 21, and the controller 30 for controlling the converter 21, in which the controller 30 controls the DC voltage of the accessory side load 12 according to the electric power required by the accessory side load 12 and controls the DC voltage of the propulsive machinery side load 9 according to the electric power required by the propulsive machinery side load 9 and the converter capacity that represents the current capacity of the converter 21.

According to the present embodiment arranged as described above, it is possible to reduce the capacity of the converter 21 by connecting the converter 21 that excites the secondary winding of the induced generator 20 to the sub-winding. It is also possible to output the electric power required by the accessory side load 12 by controlling the DC voltage of the accessory side load 12 on the basis of the electric power required by the accessory side load 12. Furthermore, it is possible to control the DC voltage of the propulsive machinery side load 9 within the range not exceeding the converter capacity by controlling the DC voltage of the propulsive machinery side load 9 on the basis of the electric power required by the propulsive machinery side load 9 and the converter capacity that represents the current capacity of the converter 21.

In addition, the controller 30 according to the present embodiment calculates the q-axis current command value (Iqref) of the induced generator 20 on the basis of the difference between the DC voltage value and the DC voltage command value of the accessory side load 12, calculates the d-axis current command value (Idref) of the induced generator 20 on the basis of the electric power required by the propulsive machinery side load 9, the DC voltage thereof, and the converter capacity, and outputs the control signal according to the d-axis current command value (Idref) and the q-axis current command value (Iqref) to the converter 21. It is thus possible to compensate for fluctuations of the voltage of the accessory side DC bus 17 that occur depending on the magnitude of the accessory side load 12 with the effective electric power of the sub-winding.

According to the present embodiment, the DC voltage of the propulsive machinery side load 9 is higher than the DC voltage of the accessory side load 12. Consequently, in the drive system for the dump truck in which the DC voltage of the propulsive machinery side load 9 is higher than the DC voltage of the accessory side load 12, it is possible to reduce the capacity of the converter 21 that excites the two-winding induced generator and perform output control according to the converter capacity. By performing output control according to the converter capacity, it is possible to reduce energy loss and heat-induced damage.

Second Embodiment

A second embodiment of the present invention will be described below primarily with respect to its differences from the first embodiment. The drive system 100 according to the first embodiment supplies electric power to the propulsive machinery side load 9 and the accessory side load 12 with only the excitation converter 21 that is connected to the sub-winding of the two-winding induced generator 20. Therefore, a failure of the excitation converter 21 possibly makes it difficult to perform voltage control over the propulsive machinery, disrupting the operation of the machine. The present embodiment allows fallback operation in the event of failure of the excitation converter.

Figure 7:
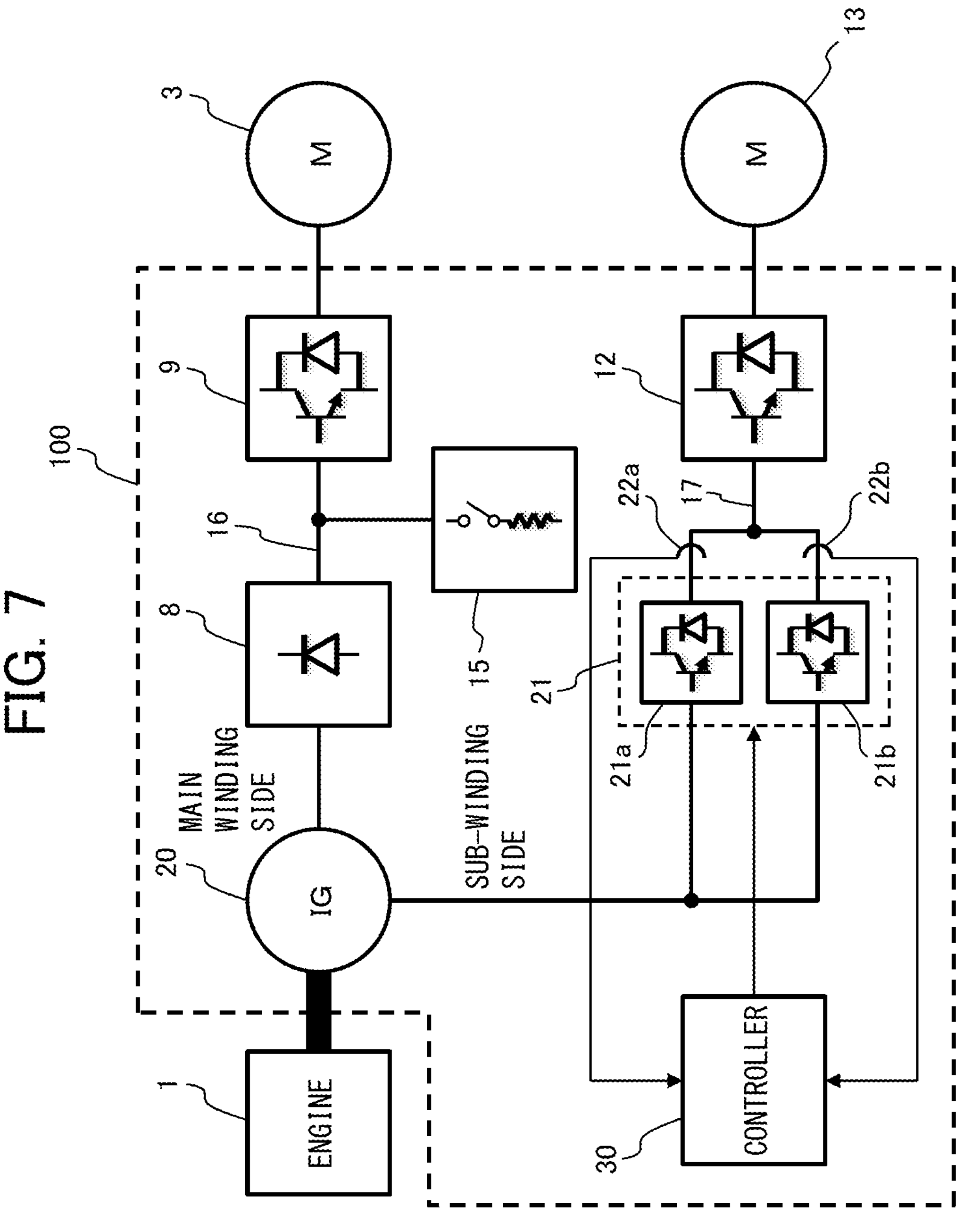
FIG. 7 is a diagram illustrating a configuration of a drive system according to a second embodiment of the present invention.

FIG. 7 illustrates a configuration of a drive system according to the present embodiment. As illustrated in FIG. 7, the drive system according to the present embodiment is different from the drive system according to the first embodiment in that the excitation converter 21 includes two converters 21*a* and 21*b*, though the number of converters is not limited to two.

The controller 30 according to the present embodiment measures currents outputted from the converters 21*a* and 21*b* with respective sensors 22*a* and 22*b*. The controller 30 determines a converter that does not output a current as a failure, and turns off the gate of the converter. At this time, the current limiting section 33*d* (see FIG. 6) updates the converter capacity with a value obtained by adding up only the capacities of normal converters, and recalculates a d-axis current command value (Idref).

For example, assuming that the two converters 21*a* and 21*b* illustrated in FIG. 7 have the same current capacity, the converter capacity becomes ½ of the converter capacity prior to the failure. When the converter capacity is reduced to ½, since the upper limit for the magnitude (I1) of the current of the two-winding induced generator 20 as expressed by the equation (1) is reduced to ½, the d-axis current command value (Idref) that is finally calculated is limited accordingly. The controller 30 calculates the electric power required by the travelling inverter 9 according to the DC bus voltage of the propulsive machinery side load 9 that is realized by the newly limited d-axis current command value (Idref), and outputs a control signal according to the required electric power to the travelling inverter 9. At this time, since the DC voltage of the propulsive machinery side load 9 that is realized by the newly limited d-axis current command value (Idref) is a considerably low voltage, the electric power supplied to the propulsive machinery side load 9 is smaller than that supplied when the excitation converter 21 is normal. It is thus possible to continue to drive the machine by fallback operation even in the event of failure of either one of the converters 21*a* and 21*b*.

Conclusion

The controller 30 according to the present embodiment changes, in a case where the converter capacity is changed, the d-axis current command value (Idref) based on the electric power required by the propulsive machinery side load 9, the DC voltage of the propulsive machinery side load 9, and the changed converter capacity.

According to the present embodiment arranged as described above, in a case where the converter capacity is changed, it is possible to control the DC voltage of the propulsive machinery side load 9 within a range not exceeding the changed converter capacity.

Further, the converter 21 according to the present embodiment includes the converters 21*a* and 21*b*, and the controller 30 has the sensors 22*a* and 22*b* for sensing direct currents outputted from the respective converters 21*a* and 21*b*. When direct currents are outputted from the respective converters 21*a* and 21*b*, the controller 30 calculates the sum of the capacities of the converters 21*a* and 21*b* as a converter capacity. When no direct current is outputted from a certain one of the converters 21*a* and 21*b*, the controller 30 calculates the sum capacity of the converter excluding the certain converter from the converters 21*a* and 21*b* as a converter capacity. In the case of failure of either one of the converters 21*a* and 21*b*, therefore, it is possible to control the DC voltage of the propulsive machinery side load 9 within a range not exceeding the sum capacity of the normal converter.

Although the embodiments of the present invention have been described in detail above, the present invention is not limited to the above embodiments and covers various changes and modifications therein. For example, the above embodiments have been described in detail for an easier understanding of the present invention, and the present invention should not be limited to any arrangements including all the features described above. Some of the features of one of the embodiments may be added to the features of the other embodiment, and some of the features of one of the embodiments may be deleted or replaced with some of the features of the other embodiment.

DESCRIPTION OF REFERENCE CHARACTERS

1: Engine
2: Main generator
3: Travelling motor
4L, 4R: Driven wheel
5L, 5R: Drive wheel
6: Driver's cabin
7: Vessel
8: Rectifier
9: Travelling inverter (propulsive machinery side load)
11: Sub-rectifier

12: Accessory inverter (accessory side load)
13: Accessory motor
14: Sub-generator
15: Discharging resistor
16: Propulsive machinery side DC bus
17: Accessory side DC bus
20: Two-winding induced generator
21: Excitation converter
21*a*, 21*b*: Converter
22*a*, 22*b*: Sensor
30, 30X: Controller
31: Voltage deviation computing section
32: Voltage controlling section
33: Current command determining section
33*a*: Target DC voltage determining section
33*b*: Target field current determining section
33*c*: Generator current computing section
34: Current controlling section
100, 100X: Drive system

The invention claimed is:

1. A drive system for a dump truck, comprising:

an induced generator having a primary winding including a main winding and a sub-winding;

a rectifier for converting an AC voltage generated across the main winding into a DC voltage;

a propulsive machinery side load connected to the rectifier;

a converter connected to the sub-winding for exciting a secondary winding of the induced generator and converting an AC voltage generated across the sub-winding into a DC voltage;

an accessory side load connected to the converter; and a controller configured to control the converter, wherein the controller is configured to control a DC voltage of the accessory side load according to electric power required by the accessory side load and control a DC voltage of the propulsive machinery side load according to electric power required by the propulsive machinery side load and a converter capacity that represents a current capacity of the converter, and wherein the controller is configured to calculate a q-axis current command value of the induced generator on a basis of a difference between a DC voltage value and a DC voltage command value of the accessory side load, calculate a d-axis current command value of the induced generator on a basis of the electric power required by the propulsive machinery side load, the DC voltage thereof, and the converter capacity, and output a control signal according to the d-axis current command value and the q-axis current command value to the converter.

2. The drive system for a dump truck according to claim 1, wherein the controller is configured to calculate, in a case where the converter capacity is changed, the d-axis current command value based on the electric power required by the propulsive machinery side load, the DC voltage of the propulsive machinery side load, and the changed converter capacity.

3. The drive system for a dump truck according to claim 1, wherein the converter includes a plurality of converters, the controller has a plurality of sensors for sensing direct currents outputted from the respective converters, and the controller is configured to calculate, in a case where direct currents are outputted from the respective converters, a sum of capacities of the converters as the converter capacity, and calculate, in a case where no direct current is outputted from a certain one of the converters, a sum capacity of the converter excluding the certain converter from the converters as the converter capacity.

4. The drive system for a dump truck according to claim 1, wherein the DC voltage of the propulsive machinery side load is higher than the DC voltage of the accessory side load.

* * * * *